United States Patent Office 3,649,732
Patented Mar. 14, 1972

3,649,732
CASTABLE-REFRACTORY DIE COMPOSITION ESSENTIALLY FREE OF CALCIUM ALUMINATE AND METHOD OF USING
Kristin Brigham, New York, and Ronald C. Vickery, Northport, N.Y., assignors to Ceramco, Inc., Long Island City, N.Y.
No Drawing. Filed Oct. 28, 1969, Ser. No. 871,964
Int. Cl. C04b 35/04, 35/24; A61k 5/00
U.S. Cl. 264—63
6 Claims

ABSTRACT OF THE DISCLOSURE

A castable-refractory material having good green strength, excellent dimensional stability when fired at about 1800 to 3000° F., good hardness and strength after being fired, and thermal characteristics suiting it for use with porcelains used to make dental prostheses is obtained by mixing 140 to 100 parts of magnesium oxide with up to 32 parts of glass and about 15 to 25 parts of ammonium dihydrogen phosphate (up to 40 parts of the magnesium oxide being replaceable with alumina) to form a dry mixture and then blending 20 parts of the dry mixture with approximately 4 parts of colloidal silica sol of 40% solids content. The novel composition is superior to others previously used that contained calcium aluminate in several respects, tending to exhibit a more controllable coefficient of thermal expansion, greater as-fired hardness and strength as evidenced by a BHN of about 50, and lessened tendency toward spalling and structural breakdown after repeated firing, and thermal stability in all respects at temperatures up to 3300° F.

BACKGROUND OF THE INVENTION (1) Field of the invention

This invention relates to castable-refractory compositions that have particular properties as respects their dimensional stability, both the unfired set (green) condition and in the fired state, together with as-fired hardness and strength and a controllable coefficient of thermal expansion, this combination of properties suiting the compositions particularly for use as die material for the making of porcelain dental prostheses. The invention further relates to the method of making porcelain dental prostheses with the use of such compositions.

(2) Description of the prior art

Until a few years ago, it was necessary to make porcelain jackets by use of a matrix technique involving the use of platinum foil. More specifically, the prior practice involved having a dentist make an impression of wax, rubber or the like, and then having a technician pour a stone composition (unfireable, gypsum-base material) into the impression and set therein to form a model. Then a thimble-shaped cone of platinum foil about 0.001 to 0.002 inch thick was constructed on that model, and over it, the desired porcelain powder placed in slurry form. The porcelain and foil were then removed from the stone model, and this needed to be done very carefully in order to avoid distortion. Then the structure of porcelain and platinum foil was fired, and the platinum foil was then carefully removed from the interior of the porcelain jacket, before it could be cemented into place in a patient's mouth.

There is now known a castable-refractory, namely that of co-pending application Ser. No. 583,087, filed Sept. 29, 1966, which can be used in place of the gypsum-base material mentioned above, enabling a considerable simplification in the process of manufacturing porcelain jackets. The castable-refractory material is poured into the impression, permitted to harden, removed, fired, coated with separator material, overcoated with porcelain, and fired again without any need for removing the delicate unfired porcelain from the base upon which it is formed.

In further work, however, it has developed that the particular castable-refractory compositions disclosed in the above-mentioned application are capable of being improved upon, without at the same time sacrificing the advantages that they possess. In particular, it was observed that the compositions of that application would be more useful if they were higher in as-fired strength and hardness. While good in dimensional stability, the compositions of the above-mentioned patent application are somewhat less than ideal in that property. It has also been learned that upon repeated firing, as is necessary in the making of certain kinds of porcelain prostheses, they have a tendency to spall or break. Their adaptability for use with porcelains of different thermal expansion characteristics is less than the optimal.

The above-mentioned compositions are based upon magnesia, calcium aluminate, ammonium dihydrogen phosphate and alkali or alkaline-earth fluorides. While not wishing to be bound by any particular theory concerning the cause of the various shortcomings mentioned above of the prior-art porcelain compatible castable-refractory compositions, we would observe that the above-mentioned difficulties appear to be associated in large part with the use in that composition of a substantial proportion of calcium aluminate. It tends to have a low coefficient of thermal expansion, for which compensation is made by the addition of the fluoride, and to shrink upon firing, for which compensation is made by the inclusion of the phosphate. The simultaneous presence of substantial calcium and silica leads to the formation of calcium orthosilicate, which undergoes a phase transformation upon repeated firing, leading to the above-mentioned spalling and breaking. It has not, however, been immediately apparent or obvious to those skilled in the art of compounding castable-refractory compositions how the foregoing difficulties could be overcome by using different ingredients or proportions but still maintaining to the same degree, or substantially so, all of the advantages possessed by the prior-art composition.

Further in regard to the state of the prior art reference is made to the article "The Direct Fabrication of Restorations Without Foil on a Refractory Die," by R. C. Vickery, L. A. Badinelli, and R. W. Waltke, J. Prosth. Dent., 21, 227 (1969).

SUMMARY OF THE INVENTION

We have discovered that we can obtain a porcelain compatible castable-refractory composition that is greater in as-fired strength and hardness, and somewhat more resistant to spalling and cracking upon repeated firing, than those similar compositions that have been previously known; that the novel compositions of the present invention may readily be adjusted with respect to thermal expansion coefficient so as to be used with a broad variety of porcelains; that staisfactory dimensional stability can be maintained, both as respects the hardening of the cast refractory when green and as respects the maintenance of desired dimensions after firing at about 1800 to 3300° F.; and that the foregoing may be done by making a castable-refractory composition by mixing 140 to 100 parts by weight of magnesia, up to 40 parts by weight of alumina, up to 32 parts of a soda-lime-silica glass containing suitable expansion-coefficient-modifying additions, and about 15 to 25 and preferably 20 parts of ammonium dihydrogen phosphate to form a dry blend, and then mixing 20 parts of the dry blend with 4 parts of colloidal silica sol of 40 weight percent solids content. The above proportions may be departed from while remaining within certain ranges as herein taught, and in some instances, substitute ingredients may be used. Ordinarily, at temperatures above about 1960° F., the glass is not incorporated into the mixture since $MgO-Al_2O_3$-phosphate reaction is of sufficient magnitude to impart the necessary characteristics.

The slurry formed by mixing the dry blend with the colloidal silica sol is then poured into an impression and allowed to set for about 30 minutes, removed from the impression and then fired at 75° F. per minute to a temperature 50° above that of intended use.

DESCRIPTION OF THE PREFERRED EMBODIMENTS

The present invention comprises a novel porcelain-compatible castable-refractory composition. It is made by mixing certain ingredients to form a dry blend, and then mixing the dry blend with a colloidal silica sol, such as the material sold by E. I. du Pont de Nemours under the name "Ludox," a material having a 40 weight percent solids content, with the solids being substantially silica suspended colloidally in a suitable and compatible vehicle.

The dry ingredients comprise magnesia and ammonium dihydrogen phosphate, and may include alumina and soda-lime-silica glass.

The magnesia is preferably in very finely divided form, and is in no event any coarser than minus 60 mesh. It is chemically pure.

The magnesia may be replaced in part by alumina. The alumina used is preferably in very finely divided form, and is not coarser than minus 60 mesh. It is also preferably chemically pure.

The glass that may be used is a soda-lime-silica glass, suitably modified with agents that alter appropriately its thermal-expansion characteristics. We have obtained satisfactory results with the use of Ceramco Glass No. 168, manufactured by Ceramco Equipment Company, Inc. of Long Island City, N.Y., which is made by adding lithium oxide and magnesium oxide to Corning Glass No. 0080, manufactured by Corning Glass Works, Corning, N.Y., which has a typical analysis of 72% silica, 3% magnesia, 15% $Na_2O$, 1% alumina, and 9% CaO. The No. 168 glass is made by mixing 2.4% of $Li_2O$ and 14.6% of MgO with 83% of the above-mentioned Corning Glass No. 0080. The above proportions may be varied somewhat; we may use 2 to 10% of lithium oxide and 10 to 20% of magnesia, together with 70 to 88% of the No. 0080 glass. It should be understood, however, that any glass having essentially the same coefficient of expansion as the magnesium oxide-aluminum oxide mixture can be used in its place.

There are different porcelains that are used for making dental prostheses, and they differ in thermal expansion and firing characteristics. It is important to avoid mismatching thermal characteristics of the porcelain and the castable-refractory.

The proportion of magnesia present in the castable-refractory compositions of our invention exerts an effect upon the amount of expansion upon setting when the castable-refractory is green and upon the amount of shrinkage upon firing; with less magnesia, there tends to be more shrinkage in both operations. The effect of the lithium oxide in the glass, as greater amounts of it are used, is to decrease the melting point. Moreover, with increasing amounts of lithium oxide, the coefficient of expansion becomes somewhat greater, then somewhat less than with a maximum being observed at about 7% of lithium oxide used with the No. 0080 glass.

When present, the suitably modified soda-lime-silica glass is utilized in the form of a fine powder, not coarser than minus 100 mesh and preferably about minus 160 mesh.

The ammonium dihydrogen phosphate is also in finely divided form, not coarser than minus 100 mesh and preferably not coarser than minus 120 mesh. It is chemically pure.

The proportions in which the above ingredients are mixed with one another, and the proportions in which the dry blend is mixed with the colloidal silica sol, may be varied, within limits, to suit requirements.

One set of proportions satisfactory for use with porcelains to be fired at 1860° F. involves using, in parts by weight, 120 parts MgO, 20 parts $Al_2O_3$, 32 parts glass, and 20 parts $NH_4H_2PO_4$ to make the dry blend, and 20 parts of dry blend to 4 parts of the silica sol.

Another set of proportions satisfactory for use with porcelain to be fired at 1960° F. involves using, in parts by weight, 100 parts of MgO, 40 parts of $Al_2O_3$, 32 parts of glass, and 20 parts of $NH_4H_2PO_4$ to form the dry blend, which is then mixed with the silica sol, 20 parts of blend to 4 parts of sol.

For use with porcelains to be fired at 2200° F., we may use 100 parts MgO, 40 parts $Al_2O_3$, 20 parts $NH_4H_2PO_4$, and no glass. For 3000° F., we may use 120 parts MgO, 20 parts $Al_2O_3$, 20 parts $NH_4H_2PO_4$, and no glass. In each case, the dry blend so made is mixed with silica sol in the proportions mentioned above. When temperatures higher than about 1950° F. can be used to fire the porcelain, the reaction of magnesia-alumina-phosphate is of sufficient magnitude to impart the necessary strength and hardness.

Various factors influence the proportions selected for use in practicing the invention. The ratio of magnesia to alumina should be in the range of about 6:1 to 2.5:1. This ratio influences the amount of shrinkage that occurs upon setting and firing, and unsatisfactory amounts of shrinkage may occur when the above range is departed from with constant or no glass. Moreover, changes in the ratio within the above range will influence the thermal-expansion characteristics of the refractory, affording the possibility of adjusting the thermal-expansion coefficient of the castable-refractory composition to match more nearly that of thermal limits of the porcelain with which it is to be used. Greater amounts of magnesia favor the development of greater coefficients of thermal-expansion. The amount of adjustment that can be accomplished in this way is rather limited; however, in most instances, adjusting the magnesia to alumina ratio must be practiced in combination with other measures (using No. 168 glass, etc.) to obtain a satisfactory adjustment at temperatures lower than about 1960 to 2000° F. The ratio of solids to silica sol influences the expansion on setting. The proportion of glass used also has an influence upon the hardness and as-fired strength of the refractory—more glass, greater strength. It is noteworthy that in this field, it is necessary to have a castable-refractory that, upon firing, is so dimensionally stable that after firing, it has changed dimensions by between 0.0% and +0.2%; a slight increase in size can be tolerated, but no shrinkage. Accordingly, it is possible to omit the glass altogether, but it is necessary to match the kind and amount of glass used to the kind of ceramic used, and it is preferable to limit the amount of glass used to between 14 and 18% by weight of the total composition. This applies for the No. 168 glass. As will be discussed below in connection with the possibility of substitute ingredients, other glasses might conceivably be used, and with these, the tolerable proportions might be somewhat different, although there will be, in any case where the glass does not have a coefficient of thermal expansion greater than that of the other materials, the same competing considerations, and in certain cases, the tolerable percentage range between (a) enough glass to give the needed strength and (b) so much glass as to give shrinkage, will become vanishingly small or non-existent. When the glass contains effective additions of substances promoting its thermal coefficient of expansion, the same range will be broadened. With high firing temperatures, such as over 2000° F., too much expansion may occur, so that the glass content must be lessened or eliminated altogether.

It is possible to substitute zirconia for the alumina on a weight-for-weight basis, but in most circumstances, this substitution is contraindicated by cost considerations.

Alumina may be omitted entirely, or it may be used to the extent of being present with magnesia in a ratio of up to 40 parts of alumina to 100 parts of magnesia.

Other phosphates, i.e., those of the alkali metals, may be used to some extent in place of the ammonium dihydrogen phosphate, but these do not break down as readily upon heating (the ammonium phosphate loses ammonia upon heating), and in one way or another, such as hardness, refractory temperature or expansion coefficient, the alkali-metal phosphates tend to detract from the usefulness of the composition.

Although reference is made hereinabove to the use of No. 168 glass, the invention is not limited to the use of that particular glass, or to the necessary inclusion of a glass in the composition. When a glass is used, any soda-lime-silica glass that has had its coefficient of thermal expansion promoted to the range of about 10 to $12 \times 10^{-6}$ in./in./° C. will prove satisfactory, so long as its composition is such that the presence in the final composition as-cast or as-fired, of calcium aluminate is substantially avoided, i.e., held to less than about 2%, for reasons fully explained hereinbelow.

In the foregoing, there has been explained carefully the manner of making the composition of the invention. For the most part, no instructions for its use are required, inasmuch as the composition is used in substantially the same way as that of the co-pending Vickery patent application Ser. No. 583,087, filed Sept. 29, 1966.

It bears emphasis that the present invention is to be distinguished from that of the above-mentioned application for patent principally in its avoidance, to the greatest extent practicable, of the occurrence in the composition of calcium aluminate, $3 CaO \cdot Al_2O_3$, and in the extension of the permissible range of firing temperatures. As previously mentioned, the calcium aluminate has a rather low coefficient of thermal expansion and a tendency, when silica is present, to form calcium orthosilicate, with a resultant tendency toward spalling or breaking of the cast piece upon repeated firings. Where in the composition of the above-mentioned application calcium aluminate was used to the extent of about 18% of the dry blend, we use in accordance with the present invention substantially none of it intentionally, although it may develop incidentally to some small extent (the No. 168 glass contains about 7% of lime, and it is rarely practical to exclude alumina entirely). Compared, however, with the compositions of the above-mentioned patent application, those of the present invention are substantially free of the calcium aluminate, and do not, accordingly, require the presence of the alkali or alkaline-earth fluoride also mentioned in the application. There is, however, a distinct difference in the properties of the two kinds of compositions, that of the present invention being superior, as will presently appear.

In each case, the coefficient of thermal expansion of the castable-refractory composition is about the same, with that of the present invention being slightly higher, e.g., about $11 \times 10^{-6}$ in./in./° C. for the former composition and $13 \times 10^{-6}$ in./in./° C. for that of the present invention. The latter tends more closely to approximate the coefficient for some of the porcelains more commonly used, which have coefficients of thermal expansion in the range of about 9 to $15 \times 10^{-6}$ in./in./° C. In as-fired hardness and strength, the compositions of the present invention show definite superiority—about 29 BHN and about 5000 p.s.i. vs. about 50 BHN and about 10,000 p.s.i. In both instances, there is dimensional stability—the dimensions of the fired cast piece differ from those in the impression of wax or the like by 0.0 to +0.2%. The time available for working and the time required for hardening of the two compositions are substantially the same and more variation is now permitted in the firing conditions.

The invention thus fully described above is further illustrated by the following specific examples:

Example I.—There is prepared a No. 168 glass by melting together 425 grams of No. 0080 glass with 12 grams of $Li_2O$ (added in the form of 75 grams of $Li_2B_4O_7$) and 75 grams of MgO. There is thus made a No. 168 glass comprising 83% of the No. 0080 glass, 2.4% of $Li_2O$, and 14.6% of magnesia. This is solidified and ground to minus 165 mesh. Thirty-two parts by weight of such glass are blended with 120 parts of magnesia, 20 parts of alumina, and 20 parts of ammonium dihydrogen phosphate to form a dry blend. Twenty parts by weight of such blend are then mixed with 4 parts by weight of a commercial colloidal silica sol (40 weight percent $SiO_2$ solids content in a compatible vehicle), such as that sold commercially by E. I. du Pont under the name "Ludox." This forms the castable refractory material of the invention. It hardens to a green compart in about 30 minutes, but remains substantially fluid and workable for at least five minutes after being made. It is used by being poured into an impression, allowed to harden for 30 minutes, and then after being removed from the impression, being fired in a furnace, the temperature within is raised at 75° F. per minute to a temperature about 50° F. above that of the intended use, e.g., to 1850° F. It may be held at that temperature for a minute or two and then air-cooled. The properties as respects dimensional stability and as-fired hardness and resistance to development of spalling upon repeated firings are as indicated above.

Example II.—Example I was repeated, except that the mixture used for the dry blend was 100 parts by weight of magnesia and 40 parts of alumina, the glass and the ammonium dihydrogen phosphate being used in the same number of parts as indicated in Example I. The results were the same, except that the cast-refractory exhibited a lower coefficient of thermal expansion, namely, about $14 \times 10^{-6}$ in./in./° C. vs. about $15 \times 10^{-6}$ in./in./° C. for the material of Example I.

Example III.—Example I was repeated, except that no No. 168 glass was used, the dry blend consisting of 120 parts of magnesia, 20 parts of alumina, and 20 parts of ammonia dihydrogen phosphate. The results were the same, except that the expansion of coefficient was $13 \times 10^{-6}$ in./in./° C. and the compoistion withstood firing at 3000° F.

While we have described herein certain embodiments of our invention, we intend to cover as well any change or modification therein that may be made without departing from its spirit and scope.

We claim as our invention:

1. The method of making porcelain dental prostheses that is characterized by the steps of forming an impression of wax, rubber or the like, pouring into said impression a castable-refractory composition exhibiting excellent dimensional stability as evidenced by a dimension change of between 0.0 and +0.2% from original impression dimensions when fired at 1800° F. superior as-fired hardness, as evidenced by a BHN of about 50, said composition consisting essentially of one portion by weight of a colloidal silica sol of about 40 weight percent solids content and from 2.5 to 5 portions by weight of a dry blend of ingredients, said dry blend consisting essentially of 140 to 100 parts by weight of magnesia not coarser than −60 mesh, up to 40 parts by weight of alumina not coarser than −60 mesh, a number of parts by weight of glass not coarser than −100 mesh such that said glass is present in said refractory composition to the extent of about 0 to 18 weight percent, said glass being a soda-lime silica glass having a coeffiuient of thermal expansion in the range of 10 to $12 \times 10^{-6}$ in./in./° C. and 15 to 25 parts of ammonium dihydrogen phosphate not coarser than −100 mesh, permitting said castable-refractory composition to harden while in said impression, removing as a hardened piece from said impression said castable-refractory composition, and firing said piece at a temperature of about 1800 to 3000° F. said composition in its as-fired state containing less than about 2% of calcium aluminate.

2. A method as defined in claim 1 wherein the number of parts by weight of glass used is such that said glass is present in said refractory composition to the extent of about 14 to 18 weight percent, and in that said phosphate is ammonium dihydrogen phosphate of particle size not coarser than −100 mesh.

3. The method as defined in claim 2, wherein said composition further comprises about 4 portions of dry blend per portion of colloidal silica sol.

4. A castable-refractory composition exhibiting excellent dimensional stability as evidenced by a dimension change of between 0.0 and +0.2% from original impression dimensions when fired at 1800 to 3000° F. and superior as-fired hardness, as evidenced by a BHN of about 50, said composition consisting essentially of one portion by weight of a colloidal silica sol of about 40 weight percent solids content and from 2.5 to 5 portions by weight of a dry blend of ingredients, said dry blend consisting essentially of 140 to 100 parts by weight of magnesia not coarser than −60 mesh, up to 40 parts by weight of alumina not coarser than −60 mesh, a number of parts by weight of glass not coarser than −100 mesh such that said glass is present in said refractory composition to the extent of about 0 to 18 weight percent, said glass being a soda-lime-silica glass having a coefficient of thermal expansion in the range of 10 to $12 \times 10^{-6}$ in./in./° C., and 15 to 25 parts of ammonium dihydrogen phosphate said composition in its as-fired state containing less than about 2% of calcium aluminate.

5. A composition as defined in claim 1, wherein the number of parts by weight of glass used is such that said glass is present in said refractory composition to the extent of about 14 to 18 weight percent, and said phosphate is ammonium dihydrogen phosphate of particle size not coarser than −100 mesh.

6. A composition as defined in claim 5, wherein the composition contains about 4 portions of dry blend per portion of colloidal silica sol.

References Cited
UNITED STATES PATENTS

| | | | |
|---|---|---|---|
| 2,856,302 | 10/1958 | Reuter | 106—38.3 |
| 2,895,838 | 7/1959 | Ilenda | 106—38.3 |
| 2,928,749 | 3/1960 | Watts | 106—85 |
| 2,995,453 | 8/1961 | Noble et al. | 106—85 |
| 3,078,186 | 2/1963 | Tierney | 106—58 |
| 3,309,208 | 3/1967 | Arlett et al. | 106—58 |
| 3,328,880 | 7/1967 | Schlesinger | 106—35 |

JULIUS FROME, Primary Examiner

J. H. MILLER, Assistant Examiner

U.S. Cl. X.R.

106—35, 62, 85; 264—16, 30